(12) United States Patent
Varadarajan et al.

(10) Patent No.: US 8,625,689 B2
(45) Date of Patent: Jan. 7, 2014

(54) TIME-DOMAIN LINK ADAPTATION

(75) Inventors: Badri Varadarajan, Mountain, CA (US); Anand Dabak, Plano, TX (US); Il Han Kim, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 198 days.

(21) Appl. No.: 13/179,202

(22) Filed: Jul. 8, 2011

(65) Prior Publication Data

US 2012/0033722 A1     Feb. 9, 2012

Related U.S. Application Data

(60) Provisional application No. 61/362,999, filed on Jul. 9, 2010, provisional application No. 61/391,365, filed on Oct. 8, 2010.

(51) Int. Cl.
*H04K 1/10* (2006.01)

(52) U.S. Cl.
USPC ........... 375/260; 375/259; 375/262; 375/295; 375/316; 375/340

(58) Field of Classification Search
USPC ......... 375/224, 227, 259, 260, 262, 264, 267, 375/271, 278, 290, 295, 299, 300, 316, 321, 375/322, 340–345, 350
See application file for complete search history.

(56) References Cited

U.S. PATENT DOCUMENTS

| | | | |
|---|---|---|---|
| 7,423,959 B2 * | 9/2008 | Gavillero Martinn et al. | 370/208 |
| 8,213,525 B2 * | 7/2012 | Caire et al. | 375/260 |
| 8,271,852 B2 * | 9/2012 | Kirkby | 714/762 |
| 8,275,344 B2 * | 9/2012 | Schwager et al. | 455/402 |
| 8,385,399 B2 * | 2/2013 | Yang et al. | 375/232 |
| 8,416,864 B2 * | 4/2013 | Korobkov et al. | 375/260 |
| 2004/0184398 A1 * | 9/2004 | Walton et al. | 370/203 |
| 2010/0054314 A1 * | 3/2010 | Korobkov et al. | 375/222 |
| 2011/0200058 A1 * | 8/2011 | Mushkin et al. | 370/475 |
| 2012/0140798 A1 * | 6/2012 | Kadous et al. | 375/219 |
| 2012/0170670 A1 * | 7/2012 | Zhengang et al. | 375/257 |

OTHER PUBLICATIONS

Kyoungnam Seo et al., Improved Impulse Detection in Power Line communication Systems, IEEE 2008, pp. 374-379.*

Andrea M. Tonello, Cyclic Prefix Design and Allocation in Bit-Loaded OFDM over Power Line communication Channels; IEEE vol. 58; Nov. 2010; pp. 3265-3276.*

* cited by examiner

*Primary Examiner* — Hirdepal Singh

(74) *Attorney, Agent, or Firm* — Steven A. Shaw; Wade James Brady, III; Frederick J. Telecky, Jr.

(57) ABSTRACT

Embodiments of the invention provide time-domain link adaptation in power line communications. In one embodiment, the cyclic prefix length and position is adjusted with an OFDM symbol to overlap a periodic impulse noise pulse, thereby allowing the data carried in the symbol to be detected at a receiver. The cyclic prefix may be adjusted to provide a pattern that yields an integer number of OFDM symbols in one zero crossing period. The data rate used for the symbols overlapping the zero-crossing period may be zero or very low. A high data rate may be used for symbols outside the zero-crossing period because those symbols will not be affected by the periodic impulse noise.

16 Claims, 4 Drawing Sheets

TIME-DOMAIN LINK ADAPTATION

CROSS-REFERENCE TO RELATED APPLICATIONS

This application claims the benefit of the filing date of U.S. Provisional Patent Application No. 61/362,999, which is titled "Adaptive Bit Allocation and Coding in G.hnem," and was filed Jul. 9, 2010; and the filing date of U.S. Provisional Patent Application No. 61/391,365 which is titled "Time Domain Link Adaptation," and was filed Oct. 8, 2010, the disclosures of which are hereby incorporated by reference herein in their entirety.

TECHNICAL FIELD

Embodiments of the invention are directed, in general, to communication systems and, more specifically, to time domain link adaptation in power line communications.

BACKGROUND

It has been agreed that the G.hnem will use OFDM and will have the ability to adapt to channel conditions. Further, it is well known that the signal-to-noise ratio (SNR) changes with frequency. Consequently, it is necessary to use receiver feedback to adapt the coding scheme and adapt the modulation scheme on different subcarriers. It may also be necessary to adapt the transmit power.

Periodic impulse noise often occurs on power lines due to the zero-crossings of the AC mains. This noise may be introduced, for example, by a triac or a zero-crossing sense resistor in a dimmer circuit. These periodic impulse noise pulses may interfere with the transmission of data in power line communication systems.

SUMMARY OF THE INVENTION

Embodiments of the invention provide a system and method that identifies a duration and period of an impulse noise on a power line. A transmitter generates a plurality of Orthogonal Frequency-Division Multiplexing (OFDM) symbols to be transmitted from a first device to a second device over the power line. Each of the OFDM symbols has a cyclic prefix. The plurality of OFDM symbols are synchronized by the transmitter so that the impulse noise occurs during the cyclic prefix of one or more of the OFDM symbols. The OFDM symbols are then transmitted over the power line. The impulse noise may be caused, for example, by the zero crossing of an AC mains signal. The power line may be a low voltage power line. The first device may be a base node in a power line communication system.

In another embodiment, a method and system identify a duration and period of an impulse noise on a power line. A transmitter generates a plurality of OFDM symbols to be transmitted from a first device to a second device over the power line. Each of the OFDM symbols has a cyclic prefix. The size of the cyclic prefix in the plurality of OFDM symbols is selected to ensure approximately an integer number of OFDM symbols per zero-crossing cycle. A first group of OFDM symbols is transmitted and overlap, at least in part, the impulse noise on the power line. The first group of OFDM symbols has a first data rate. A second group of OFDM symbols that do not overlap the impulse noise are transmitted on the power line. The second group of OFDM symbols has a second data rate. The first data rate is a relatively low data rate and may be no data per symbol. The second data rate is a relatively high data rate.

The impulse noise may be caused by the zero crossing of an AC mains signal. The size of the cyclic prefix in the plurality of OFDM symbols may be selected to ensure 14 OFDM symbols per zero crossing. Alternatively, the size of the cyclic prefix in the plurality of OFDM symbols may be selected to ensure 23 OFDM symbols per zero crossing.

Feedback information may be received from a receiver. In one embodiment, the feedback comprises data identifying a signal-to-noise ratio (SNR) for each of a block of signals. The first group of OFDM symbols may be identified based upon symbols having an SNR above a threshold level. The second group of OFDM symbols may be identified based upon symbols having an SNR below a threshold level.

In one embodiment, an apparatus comprises a transmitter and a processor. The transmitter is adapted to generate a plurality of OFDM symbols, each having a cyclic prefix. The processor is coupled to the transmitter and is adapted to receive feedback data from a receiver. The feedback data may comprise a signal-to-noise ratio (SNR) for each of a block of OFDM symbols. The processor may determine a data rate to use for each symbol based upon the feedback data. The transmitter may be further adapted to generate symbols having a low data rate if the symbols will be transmitted during a high SNR period and to generate symbols having a high data rate if the symbols will be transmitted during a low SNR period. The low data rate may be that no data is transmitted.

BRIEF DESCRIPTION OF THE DRAWINGS

Figure 1:
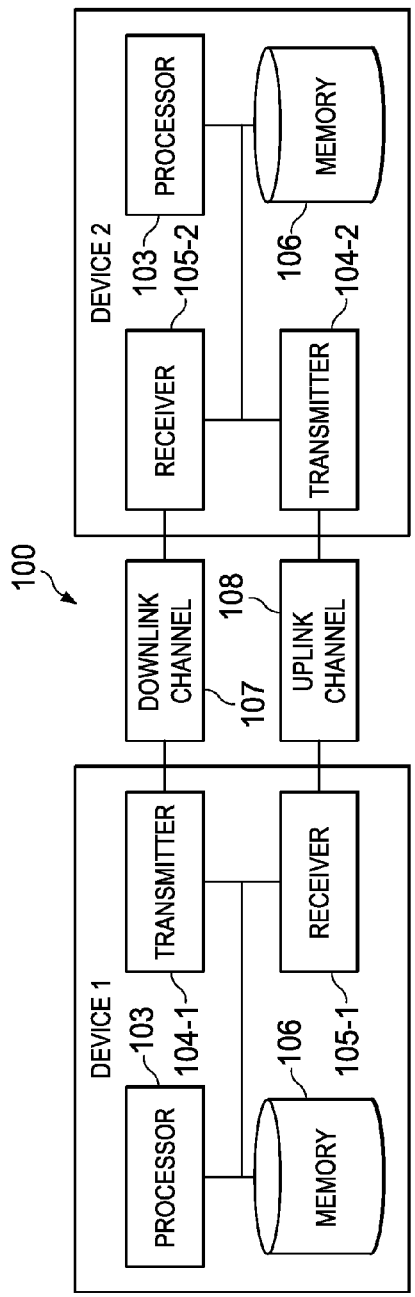
Figure 2:
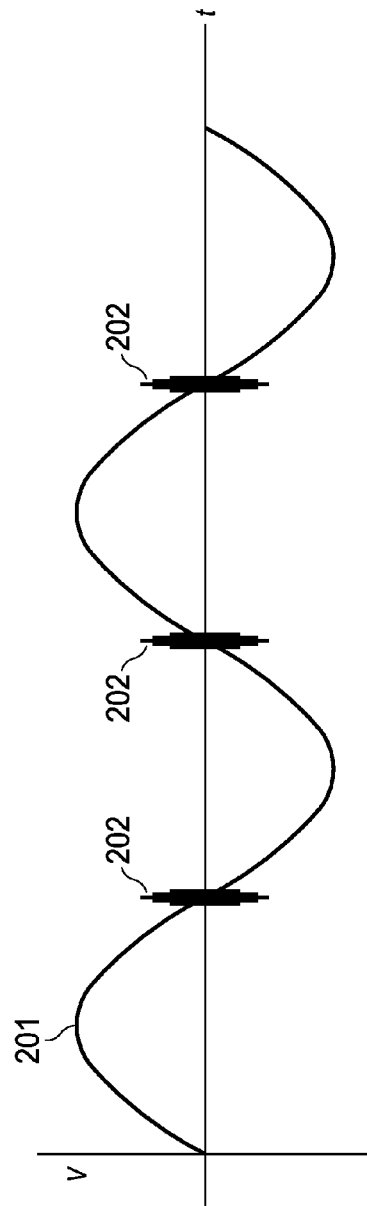
Figure 3:
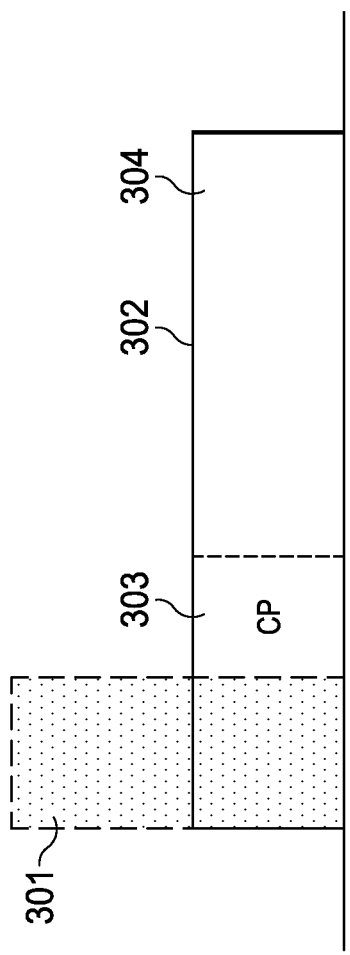
Figure 4:
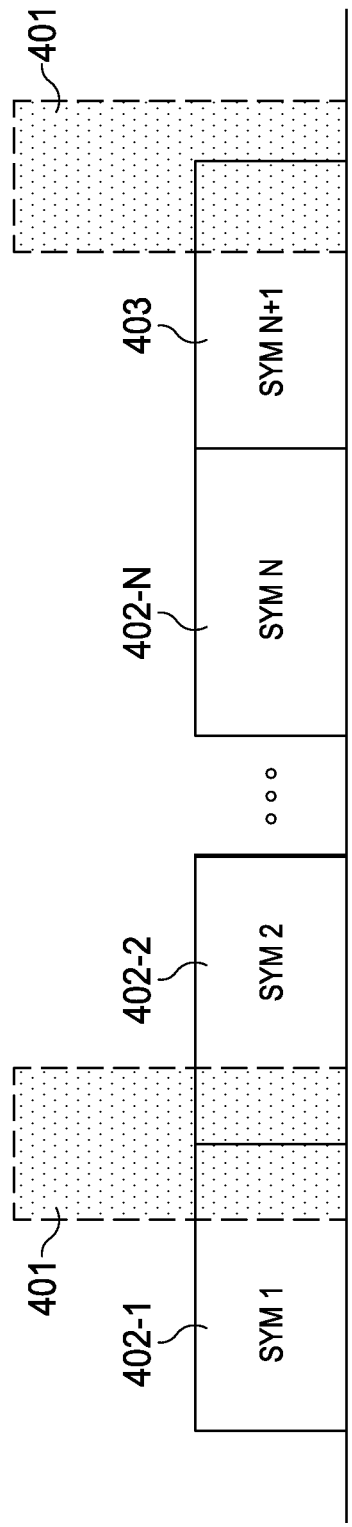
Figure 5:
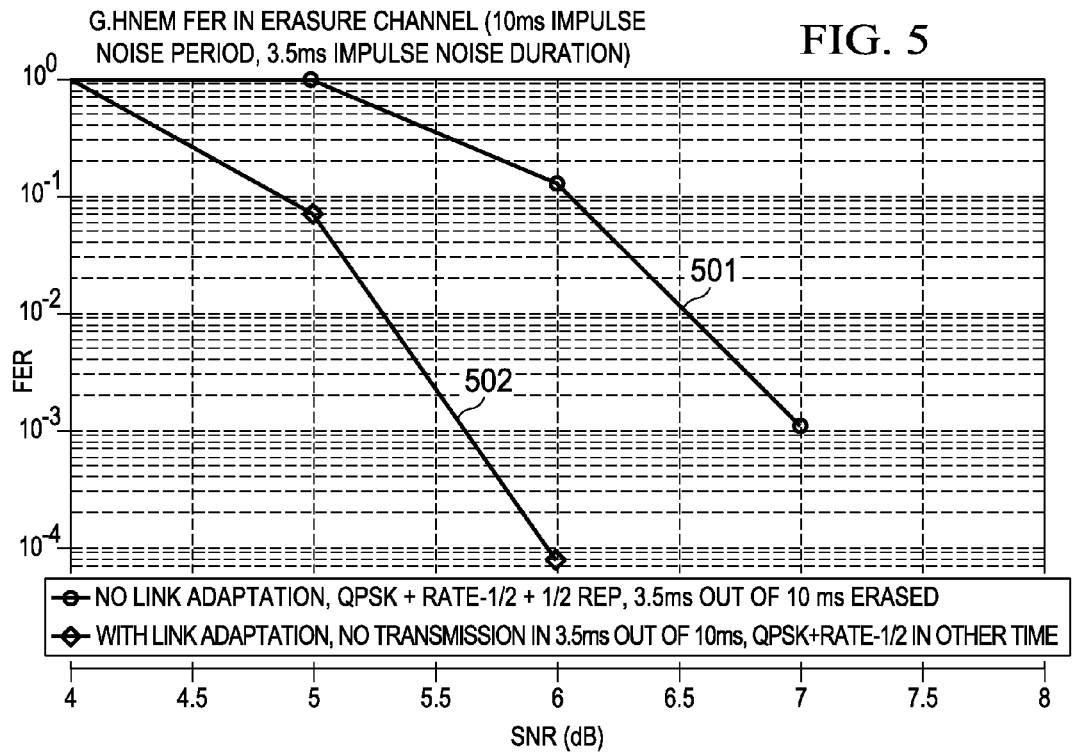
Figure 6:
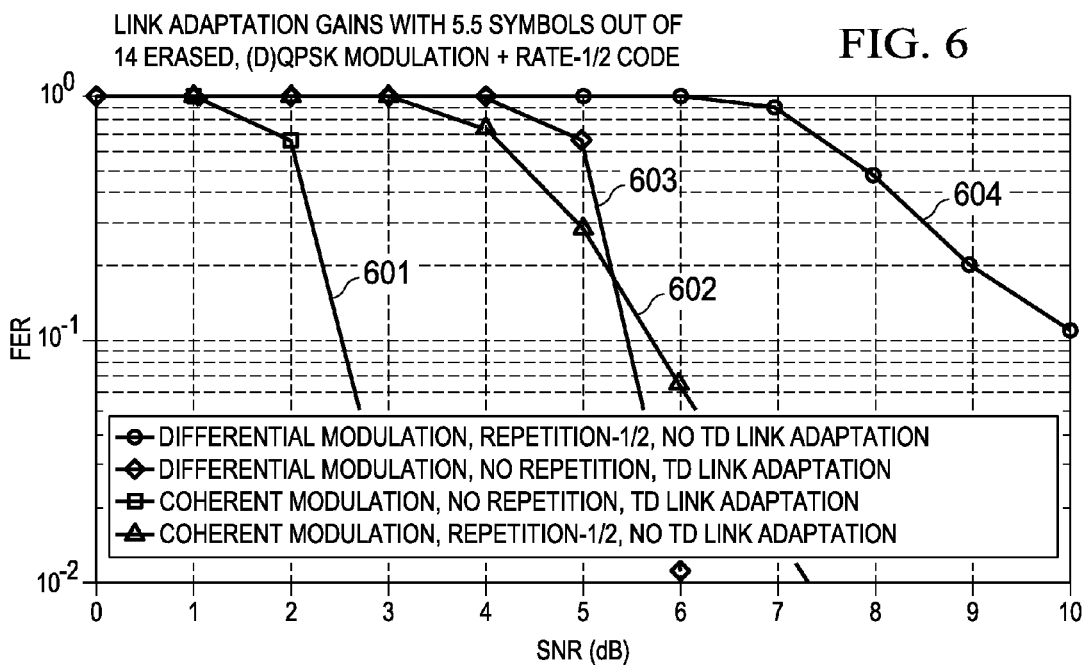
Figure 7:
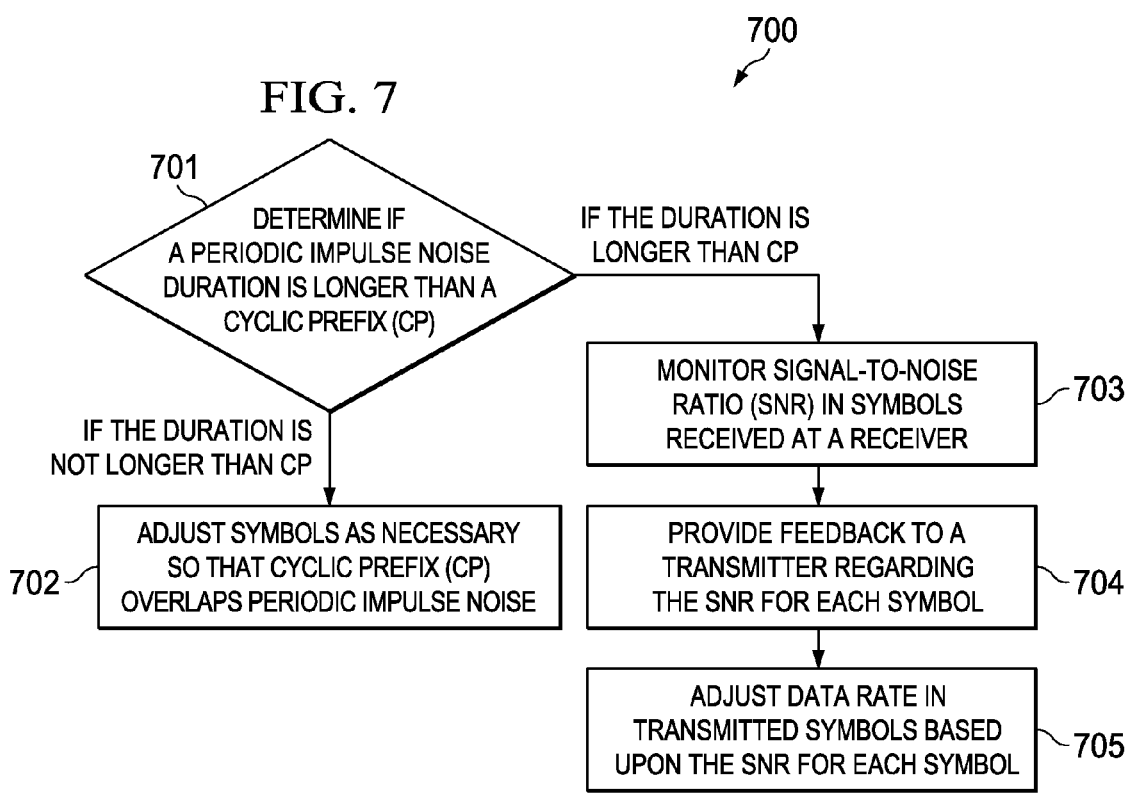

Having thus described the invention in general terms, reference will now be made to the accompanying drawings, wherein:

FIG. 1 is a block diagram of a system for implementing embodiments of the invention;

FIG. 2 illustrates periodic impulse noise that occurs in one embodiment of a power line communication system;

FIG. 3 illustrates a cyclic prefix with an OFDM symbol that is affected by periodic impulse noise on a power line that is caused, for example, by an AC mains zero crossing;

FIG. 4 illustrates time-domain link adaptation, wherein a smaller data rate is transmitted on symbols affected by the impulsive noise;

FIG. 5 illustrates simulation results for a system according to one embodiment;

FIG. 6 illustrates simulation results for a system according to another embodiment; and FIG. 7 illustrates a process for compensating for periodic impulse noise in a communication system using time-domain link adaptation.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a block diagram of a system 100 for implementing embodiments of the invention. Devices 101 and 102 communicate via channels 107 and 108. Devices 101 and 102 comprise a processor 103 for processing signals to be transmitted to other devices via transmitters 104 and for processing signals received from other devices via receivers 105. Signals are transmitted by transmitter 104-1 in device 101 across downlink channel 107 to receiver 105-2 in device 102. Downlink channel 107 may comprise noise and other channel characteristics that affect the transmitted signals before they are detected at receiver 105-2.

Similarly, signals are transmitted by transmitter 104-2 in device 102 across uplink channel 108 to receiver 105-1 in device 101. Uplink channel 10 may comprise noise and other channel characteristics that affect the transmitted signals before they are detected at receiver 105-1.

Downlink channel 107 and uplink channel 108 may represent a wired or wireless interface between devices 101 and 102. For example, device 101 may be a base node, concentrator, or other device that acts as the master of the network or communication technology in a powerline communication (PLC) network. Device 102 may be a modem, meter, or other device that may benefit or need to exchange data with the base node, including, for example, a home area network, access point, base station, picocell/femtocell, electric vehicle charging station, or the like. Channels 107 and 108 in the PLC network may include transitions between medium voltage (MV) lines and low voltage (LV) lines across transformers or other interfaces. For example, device 101 may be connected to an MV line, and device 102 may be connected to an LV line that is in turn coupled to the MV line by a transformer.

The communication signals exchanged between devices 101 and 102 may be Orthogonal Frequency-Division Multiplexing (OFDM) signals that comply with the G.hnem, PRIME (Powerline Related Intelligent Metering Evolution), G3, or IEEE P1901.2 standards. In other embodiments, the devices 101 and 102 may communicate via wireless channels 107 and 108 using OFDM signals.

Processors 103 may be a software, firmware, or hardware based component, or a combination thereof. Processors 103 may also control the modulation of transmitted signals between the devices 101, 102. Memories 106 may be used to store signals and symbols to be transmitted, received signals and symbols, modulation schemes, and computer program instructions, software and firmware used by processors 103, and any other parameters needed in the course of communication. It will be understood that memory 106 may be any applicable storage device, such as a fixed or removable RAM, ROM, flash memory, or disc drive that is separate from or integral to processor 103.

It will be understood that the devices 101 and 102 in FIG. 1 are presented for illustrative purposes only and are not intended to limit the scope of the systems or devices that are capable of employing the pilot structures described herein.

Embodiments of the invention apply time-domain link adaptation in power line communication networks using G.hnem or other standards, such as PRIME or G3. For example, the G.hnem standard specifies frequency-domain bit-allocation tables to combat frequency-selectivity of the channel response and noise energy. However, it is known that the noise is time-selective and often synchronous with the zero crossings of the AC mains and, consequently, periodic. Time-domain link adaptation may be used to combat such periodic noise.

FIG. 2 illustrates periodic noise that occurs in one embodiment of a power line communication system. AC mains signal 201 is carried on the power lines. The frequency of the AC main signal 201 may be, for example, 60 Hz in the United States or 50 Hz in other countries. Noise peaks 202 may occur at the zero crossings of the AC mains signal 201. These noise peaks 202 may be caused by the voltage change at the zero crossings in certain devices or switches on the power line network.

FIG. 3 illustrates a periodic noise spike 301 on a power line that is caused, for example, by an AC mains zero crossing. Symbol 302 is transmitted on the power line at the same time as noise spike 301. If the cyclic prefix (CP) 303 in symbol 302 is selected properly, then the CP 303 will overlap noise spike 301, but the data 304 carried in symbol 302 will not be affected by periodic noise spike 301. Although FIG. 3 illustrates a symbol 302 that begins at the same time as periodic noise spike 301, it will be understood that this is not required and that, in other embodiments, symbol 302 may begin prior to periodic noise spike 301 and have a CP 303 that overlaps the periodic noise spike 301.

In one embodiment, the cyclic prefix length in the OFDM signals on the power line network are selected to ensure that an integer number of OFDM symbols or close to an integer number of OFDM symbols overlap the zero crossings. TABLE 1 lists suggested values of the total guard interval based upon the tone spacing for G.hnem OFDM. The cyclic prefix lengths are fixed values instead of periodic patterns as may be used in other embodiments. The use of fixed cyclic prefix lengths yields nearly an integer number of symbols. For example, in the Cenelec-A band, with 30 samples at 400 kHz as the total guard interval, 14 symbols span 10.01 ms. With respect to the AC mains, the symbols drift at 10 μs per half-period for this configuration. This is well within the tolerance of the AC mains frequency itself and, therefore, this drift can be tolerated. Similarly, for the FCC band, a 68-sample guard interval only leads to a drift of 4.17 μs per half-mains period.

TABLE 1

| Bands | Proposed tone spacing and FFT length | Nearest integer number of OFDM symbols between zero crossings |
| --- | --- | --- |
| CENELEC | 30 samples @ 400 kHz (75 μs) | 14 symbols (10.01 ms) |
| FCC | 68 samples @ 1600 kHz (42.5 μs) | 23 symbols (8.372 μs) |

Certain benefits may be achieved by synchronizing the symbol period to the AC mains zero crossings. In one embodiment, the interleaver length is selected based on the AC mains period. This achieves most of the interleaving gains for the case of periodic impulsive noise. For example, the interleaver length for the Cenelec-A band may be chosen to be an integer number of OFDM symbols, whose span does not exceed 10 ms.

In one embodiment, the symbol length may be selected to be equal to or very close to a divisor of the zero-crossing duration. For example, given the symbol period $T_{sym}$ and the number of symbols $N_{sym}$, the zero crossing period $T_{zc}$ can be expressed as $T_{sym} \times N_{sym} + T_{rem}$, where $T_{sym}/2 \leq T_{rem} < T_{sym}/2$. The value of $T_{sym}$ may be selected so that $T_{rem}$ is close to zero in one embodiment.

One potential benefit of synchronizing symbols to AC mains is time-domain link adaptation. For example, to handle the case where impulsive noise is much longer than the cyclic prefix, such as if periodic noise pulse 301 was much longer than CP 303 in FIG. 3, the system could instead use time-domain link adaptation as illustrated in FIG. 4. A block of N symbols (e.g. 402-1 to 402-N) is transmitted on the power line. A few symbols (402-1, 402-2) in the block are affected by impulsive noise 401, which may be caused by AC mains zero crossings. Using simple receiver feedback, the transmitter can adapt the data rate in each symbol 402 to the SNR for that symbol 402. For example, no data might be transmitted in the symbols 402-1, 402-2, which are affected by the impulse noise 401. In another embodiment, a very low data rate and/or highly redundant data may be transmitted in symbols 402-1, 402-2 so that the receiver might be able to detect the data despite impulse noise 401. On the other hand, outside of impulse noise 401, the maximum data rate may be transmitted in the remaining (N−2) symbols in the block (e.g. 402-3 (not shown) to 402-N). FIG. 4 illustrates time-domain link adaptation, where a smaller data rate is transmitted on symbols affected by the impulsive noise.

The link adaptation process mentioned above is a time-domain equivalent of frequency-domain link adaptation, such as adapting modulation parameters on different tones in response to channel variations or narrowband interference. In powerline communications, periodic impulsive noise is a dominant noise source. Therefore, time-domain link adaptation may be equally effective as, and should be combined with, frequency-domain link adaptation. In an extreme case, a system may use two-dimensional link adaptation for cases where the periodic impulsive noise is also frequency selective and concentrated on a few tones.

Implementation of the method described herein requires only receiver feedback of the phase on which AC mains is present and the SNR profile across different symbols. The method does not require the transmitter to synchronize symbol start with the zero crossing.

In other embodiments, different variations are possible based on the general principle of time-domain link adaptation. If some symbols have such high noise levels that those symbols cannot be used, then in those symbols: (i) dummy data can be transmitted, (ii) only pilots can be transmitted, (iii) neither pilot nor data may be transmitted, or (iv) neither pilots nor data may be transmitted and the pilot phase may not count up.

FIG. 5 illustrates simulation results for a system assumed to have a 3.5 ms impulse noise duration with 10 ms impulse noise period. The Frame Error Rates (FER) for two scenarios are compared in FIG. 5. Curve 501 (marked with circles) represents performance without time-domain link adaptation when packets with DQPSK+rate ½ convolution code+repetition 2 code are used. Due to the impulsive noise, 3.5 ms of the symbols are erased at the receiver out of every 10 ms.

Curve 502 (marked with diamonds) denotes system performance with time-domain link adaptation applied. In the simulated system, it is assumed that no symbols are sent when impulse noise occurs. For example, there will be no transmission for a 3.5 ms duration overlapping the impulse noise during every 10 ms. In the periods when impulse noise does not occur, the transmitter sends packets with DQPSK+rate ½ convolutional code.

These simulation results show that approximately 1.5 dB gain may be achieved if time-domain link adaptation is used. Additionally, the time-domain link adaptation saves the transmit energy during the erased portions of the received signal by simply not transmitting in those periods. The main reason for this advantage is that the coding architecture does not easily handle the case of unequal input SNRs. Link adaptation offers a method of achieving the best performance gains from the current coding architecture.

FIG. 6 illustrates simulation results for another embodiment using time-domain link adaptation. As noted above, synchronizing the impulse noise with the symbol boundary is not required. For example, consider the case where 5.5 symbols out of 14 symbols are erased due to periodic impulsive noise. For completeness, both coherent and differential modulations are considered in FIG. 6. Curves 601 and 602 curves represent coherent modulation, and curves 603 and 604 represent differential modulation. In both cases, time-domain link adaptation yields performance gains of more than 3 dB, while preserving the data rate.

In the comparison shown in FIG. 6, the net data rate is the same. With time domain link adaptation (601, 603), the QPSK+rate-½ combination is transmitted roughly in 8.5 out of 14 symbols. Thus, the spectral efficiency—without accounting for any other overhead—is (8.5/14) or approximately 0.6 b/s/Hz. This is compared against a system that transmits QPSK+rate-½+repetition-½ combination that transmits all the time (i.e. no time-domain adaptation shown in curves 602, 604) yielding a spectral efficiency of 0.5 b/s/Hz. Thus, the curve with time domain link adaptation actually lowers error rates for the same additive noise level, while at the same time achieving around 30% higher spectral efficiency. The intuitive reason for this is the nature of the FEC (Forward Error Correction) design. The concatenated code with repetition approaches capacity on an additive noise channel, but does not optimally handle the erasure channel. When 50% of the bits are erased, the resultant loss in performance is more than 3 dB for the concatenated code. Viewed differently, the current coding architecture (like many other coding architectures) does not easily handle the case of unequal input SNRs. Link adaptation offers a method of achieving the best performance gains from the current coding architecture.

Two drawbacks of time-domain link adaptation have been noted.

First, time-domain link adaptation is a link adaptation technique and, therefore, does not work for broadcast and multicast data. However, such packets are transmitted with low modulation and coding schemes and, for such cases, interleaving depths of greater than 10 ms can easily be obtained with existing interleavers and without increasing memory loss. In any case, alternative proposals for the interleaver also require some form of receiver feedback to select the Reed Solomon code rates depending on the noise model.

Second, time-domain link adaptation requires sophisticated receiver feedback to work. To be more precise, the feedback requirements are given below.

The receiver provides feedback comprising some compressed form of SNR on each of 14 or 23 symbols (depending on Cenelec or FCC bands) with respect to a known reference point. This may be either (i) the zero crossing duration of the AC mains line to which the receiver is connected, or (ii) the start of the first symbol received from the transmitter to which the feedback is being sent.

The transmitter receives above feedback identified above and determines the bit allocation for each of the 14 or 23 symbols in one period. In the simplest form, some of the symbols are blanked and do not carry any information bits. This pattern is signaled in the header and is then repeated for all the data symbols. Reference to AC mains is not necessary.

The cyclic prefix length embodiment includes a proposed carrier spacing for the G.hnem standard, but would work with other carrier spacing as well. Furthermore, the gains of choosing a cyclic prefix pattern that yields integer number of OFDM symbols in one zero crossing period are described above. Performance results with time-domain link adaptation are also shown above.

It has been agreed that G.hnem will use OFDM and will have the ability to adapt to channel conditions. Further, it is well known that SNR changes with frequency. Consequently, it is necessary to use receiver feedback to adapt the coding scheme, and adapt the modulation scheme (and possibly also the transmit power) on different subcarriers.

Link adaptation itself can be a complicated process involving data processing and signaling at multiple locations. The following discussion breaks down the link adaptation issue into smaller components to facilitate understanding.

Link adaptation can be broken down into the following steps:

Step one—Receiver Measurement and Feedback. In this step, the receiver measures the channel quality on various subcarriers or groups of subcarriers and feeds the channel quality data back to the transmitter. The following data needs to be identified:

Link quality metric: The link quality metric should enable estimation of the maximum data rate that can be achieved given the channel and noise conditions. The rawest form of the link quality metric is the signal-to-noise ratio (SNR) on each subcarrier or group of subcarriers. Based on the subcarrier SNR, near-optimum choices may be made for the modulation scheme for individual subcarriers, coding scheme across all subcarriers, and (optionally) the power distribution across subcarriers. The optimum choices may also vary depending on the size of the data to be transmitted. Since the receiver does not have access to this information, in one embodiment, the receiver feeds back a compressed version of the signal-noise-ratio on different subcarriers as link quality metric. It is possible to define a reversible mapping between the SNR and spectral efficiency/capacity. These quantities could be used instead of SNR.

Frequency Granularity: Adjacent subcarriers often have correlated signal-to-noise ratios. This fact can be used to design compress the feedback signal. In one embodiment, one link quality metric is calculated for a sub-band of adjacent carriers. The sub-band size may be chosen adaptively, or it may be fixed for a given band. In addition to improving the efficiency of signaling, the use of sub-bands also enables more accurate estimates of signal-to-noise ratio. In addition to this, other compression schemes may be used to exploit correlation between adjacent sub-bands.

Initiation of Link Quality Report: Since the statistics of the channel and noise both vary slowly, feedback may be done occasionally. This may be done either by (i) aperiodic polling by the transmitter and corresponding response by the receiver, (ii) aperiodic update by the receiver in response to measured variations in the noise or signal level, or (iii) pseudo-periodic (i.e. as periodic as possible, given network traffic conditions) update configured by the transmitter—for example, during connection setup. All three options may be supported by a standard, such as G.hnem, by defining corresponding LLC (Logical Link Control) packets.

Step two—Calculation of Bit Allocation and Code Rate. With frequency-selective CQI (Channel-Quality Indication) reporting, different vendors might have their own method of calculating the bit allocation or modulation on each tone and the coding scheme to be used. To achieve some uniformity, the standard may specify the MCS (Modulation and Coding Scheme) calculation procedure only for a few simple cases, such as, for example, when the SNR is the same throughout the band. The standard may also specify a few other cases of narrowband interference and impulsive noise. The signaling should support a broad range of possible choices, with the following properties.

Step three—Signaling. For each frame, the transmitter may signal the current modulation and coding scheme to the receiver. The signaling scheme should incur low overhead, while at the same time ensuring robustness and flexibility in the choice of MCS.

Per-frame signaling or signaling with memory: A basic choice to make is the "memory" in the signaling process. In a memoryless approach, all information about the bit allocation and coding for a given scheme are contained in that frame. Thus, each frame can have independent bit allocations from other frames. Another alternative is to set up a table of bit allocation and coding schemes, and refer to the index in that table. In such a method, the bit allocation can only be decoded by the intended receiver, and only after the transmitter identity is known.

The latter approach is useful only when the number of sub-bands is large. For example, it may be better to use per-frame signaling for the Cenelec bands, even if table-based signaling is used for the FCC band.

Number of Sub-bands: Increasing the number of sub-bands enables finer tuning to channel conditions, but the incremental advantage of additional sub-bands diminishes beyond a point. In one embodiment, the number of sub-bands is restricted in the available bandwidth to sixteen or fewer in the Cenelec bands, and twenty-four or fewer in the FCC band.

Compression Techniques: Irrespective of which signaling approach is used, the bit allocation and coding scheme indicators for different sub-bands should be compressed to achieve efficient signaling. For the bit allocation table, the target should be to achieve one bit of signaling per sub-band. Thus, with sixteen sub-bands, the bit allocation should be conveyed in sixteen bits or less. The coding scheme may be signaled separately.

Evaluation Methodology. Variable bit allocation across tones is likely to be useful only in conditions where the noise or channel response has sharp frequency variations. To quantify the performance of any scheme, simulations may be run to obtain throughput versus SNR curves with realistic estimates of channel and noise variance estimation errors.

FIG. 7 illustrates a process 700 for compensating for periodic impulse noise in a communication system using time-domain link adaptation. In step 701, the system determines whether a periodic impulse noise duration is longer than a cyclic prefix (CP) of symbols. If the periodic impulse noise pulse duration is not longer than the cyclic prefix, then in step 702 the system adjusts the transmitted symbols so that the cyclic prefix overlaps the impulse noise. This allows the receiver to drop the cyclic prefix, which may be distorted by the noise, and still extract the transmitted data from the remaining portion of the symbol.

If the periodic impulse noise is longer than the cyclic prefix, then in step 703 the receiver monitors the SNR in the received symbols. In step 704, the receiver provides feedback to the transmitter for a block of symbols, including the SNR for each received symbol. The transmitter may use the SNR data for each symbol to identify which symbols overlap the periodic impulse noise. Using this information, the transmitter may adjust the data rate for each symbol based upon the SNR ratio in each symbol. For example, in symbols having a high SNR, the transmitter may transmit no data or some data using a very low data rate, and in symbols having a low SNR, the transmitter may transmit data at a high data rate.

It will be understood that steps 701-705 of the process illustrated in FIG. 7 may be executed simultaneously and/or sequentially. It will be further understood that each step may be performed in any order and may be performed once or repetitiously.

Many of the functions described herein may be implemented in hardware, software, and/or firmware, and/or any combination thereof. When implemented in software, code segments perform the necessary tasks or steps. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

The software code segments may be stored in any volatile or non-volatile storage device, such as a hard drive, flash memory, solid state memory, optical disk, CD, DVD, computer program product, or other memory device, that provides computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method comprising:
    identifying a duration and period of an impulse noise on a power line;
    generating, in a transmitter, a plurality of Orthogonal Frequency-Division Multiplexing (OFDM) symbols to be transmitted from a first device to a second device over the power line, each of the OFDM symbols having a cyclic prefix;
    synchronizing the plurality of OFDM symbols by the transmitter so that the impulse noise occurs during the cyclic prefix of one or more of the OFDM symbols; and
    transmitting the OFDM symbols over the power line, wherein the impulse noise is caused by the zero crossing of an AC mains signal.

2. The method of claim 1, wherein the power line is a low voltage power line.

3. The method of claim 1, wherein the first device is a base node in a power line communication system.

4. A method, comprising:
    identifying a duration and period of an impulse noise on a power line;
    generating, in a transmitter, a plurality of Orthogonal Frequency-Division Multiplexing (OFDM) symbols to be transmitted from a first device to a second device over the power line, each of the OFDM symbols having a cyclic prefix;
    selecting a size of the cyclic prefix in the plurality of OFDM symbols to ensure approximately an integer number of OFDM symbols per impulse noise;
    transmitting a first group of OFDM symbols, the first group of OFDM symbols at least in part overlapping the impulse noise on the power line, the first group of OFDM symbols having a first data rate; and
    transmitting a second group of OFDM symbols not overlapping the impulse noise on the power line, the second group of OFDM symbols having a second data rate.

5. The method of claim 4, wherein the first data rate is a relatively low data rate.

6. The method of claim 4, wherein the first data rate is no data per symbol.

7. The method of claim 4, wherein the second data rate is a relatively high data rate.

8. The method of claim 4, wherein the impulse noise is caused by the zero crossing of an AC mains signal.

9. The method of claim 8, further comprising selecting the size of the cyclic prefix in the plurality of OFDM symbols to ensure 14 OFDM symbols per zero crossing.

10. The method of claim 8, further comprising selecting the size of the cyclic prefix in the plurality of OFDM symbols to ensure 23 OFDM symbols per zero crossing.

11. The method of claim 4, further comprising:
    receiving feedback information from a receiver, the feedback comprising data identifying a signal-to-noise ratio (SNR) for each of a block of signals.

12. The method of claim 11, further comprising:
    identifying the first group of OFDM symbols based upon symbols having an SNR above a threshold level.

13. An apparatus, comprising:
    a transmitter adapted to generate a plurality of Orthogonal Frequency-Division Multiplexing (OFDM) symbols, each of the OFDM symbols having a cyclic prefix and adapted to generate symbols having a low data rate if the symbols will be transmitted during a high SNR period and to generate symbols having a high data rate if the symbols will be transmitted during a low SNR period; and
    a processor coupled to the transmitter, the processor adapted to receive feedback data from a receiver, the feedback data comprising a signal-to-noise ratio (SNR) for each of a block of OFDM symbols, the processor determining a data rate to use for each symbol based upon the feedback data, wherein the transmitter is further adapted select a size of the cyclic prefix in the plurality of OFDM symbols to ensure 14 OFDM symbols per zero crossing.

14. The apparatus of claim 13, wherein the low data rate is no data being transmitted.

15. An apparatus, comprising:
    a transmitter adapted to generate a plurality of Orthogonal Frequency-Division Multiplexing (OFDM) symbols, each of the OFDM symbols having a cyclic prefix and adapted to generate symbols having a low data rate if the symbols will be transmitted during a high SNR period and to generate symbols having a high data rate if the symbols will be transmitted during a low SNR period; and
    a processor coupled to the transmitter, the processor adapted to receive feedback data from a receiver, the feedback data comprising a signal-to-noise ratio (SNR) for each of a block of OFDM symbols, the processor determining a data rate to use for each symbol based upon the feedback data, wherein the transmitter is further adapted select a size of the cyclic prefix in the plurality of OFDM symbols to ensure 23 OFDM symbols per zero crossing.

16. The apparatus of claim 15, wherein the low data rate is no data being transmitted.

* * * * *